US012620856B2

(12) United States Patent
Li et al.

(10) Patent No.: US 12,620,856 B2
(45) Date of Patent: May 5, 2026

(54) ROTOR UNIT, ROTOR, AND MOTOR STRUCTURE

(71) Applicant: ZHEJIANG FOUNDER MOTOR CO., LTD., Lishui (CN)

(72) Inventors: Liangzi Li, Lishui (CN); Jing Chen, Lishui (CN); Junjie Zhang, Lishui (CN); Liaoliao Li, Lishui (CN); Le Zhang, Lishui (CN); Jianbin Ye, Lishui (CN)

(73) Assignee: ZHEJIANG FOUNDER MOTOR CO., LTD, Lishui (CN)

( * ) Notice: Subject to any disclaimer, the term of this patent is extended or adjusted under 35 U.S.C. 154(b) by 193 days.

(21) Appl. No.: 18/564,978

(22) PCT Filed: Nov. 10, 2021

(86) PCT No.: PCT/CN2021/129735
§ 371 (c)(1),
(2) Date: Nov. 28, 2023

(87) PCT Pub. No.: WO2023/273090
PCT Pub. Date: Jan. 5, 2023

(65) Prior Publication Data
US 2024/0364161 A1 Oct. 31, 2024

(30) Foreign Application Priority Data
Jun. 29, 2021 (CN) .......................... 202110732916.6

(51) Int. Cl.
*H02K 1/32* (2006.01)
*H02K 1/276* (2022.01)

(52) U.S. Cl.
CPC .............. *H02K 1/32* (2013.01); *H02K 1/276* (2013.01); *H02K 2201/06* (2013.01)

(58) Field of Classification Search
CPC ........ H02K 1/276; H02K 1/2766; H02K 1/32; H02K 2201/06; H02K 9/193; Y02T 10/64
(Continued)

(56) References Cited

U.S. PATENT DOCUMENTS

2010/0301697 A1 12/2010 Takahashi et al.
2012/0248906 A1 10/2012 Hayslett et al.
(Continued)

FOREIGN PATENT DOCUMENTS

CN 1913287 A 2/2007
CN 101656445 A 2/2010
(Continued)

OTHER PUBLICATIONS

Translation of foreign document JP 2019149859 A (Year: 2019).*
(Continued)

*Primary Examiner* — Alex W Mok
(74) *Attorney, Agent, or Firm* — Schwabe, Williamson & Wyatt, P.C.

(57) ABSTRACT

The present disclosure provides a rotor unit, a rotor, and a motor structure. The rotor unit includes: a rotor punching sheet; a plurality of magnet units comprising a magnet and arranged on the rotor punching sheet; and a hole structure arranged in the magnet. The rotor includes a plurality of rotor units. The motor structure includes: the rotor, a first flow guide plate having a central hole and arranged between two adjacent rotor units, and a central shaft passing through a center of the rotor and the central hole. The present disclosure can effectively reduce the cost of the magnets, and can achieve a direct cooling of the magnets, the rotor and the stator, reduce the eddy current effect, reduce costs, and greatly expand an optimization and use range of the motors when applied in the motors.

13 Claims, 13 Drawing Sheets

(58) Field of Classification Search
USPC .......................................................... 310/61
See application file for complete search history.

(56) References Cited

U.S. PATENT DOCUMENTS

| | | | | |
|---|---|---|---|---|
| 2016/0036276 A1* | 2/2016 | Yamagishi | ............... | H02K 1/22 |
| | | | | 310/59 |
| 2020/0186003 A1 | 6/2020 | Frohlich | | |
| 2020/0186007 A1* | 6/2020 | Kitao | ..................... | H02K 15/03 |
| 2020/0204021 A1* | 6/2020 | Kim | .......................... | H02K 9/19 |
| 2020/0259380 A1* | 8/2020 | Ikemoto | .................. | H02K 1/32 |
| 2020/0328657 A1* | 10/2020 | Jung | ...................... | H02K 11/21 |

FOREIGN PATENT DOCUMENTS

| | | | |
|---|---|---|---|
| CN | 209001690 | U | 6/2019 |
| CN | 209184335 | U | 7/2019 |
| CN | 111049297 | A | 4/2020 |
| CN | 111095746 | A | 5/2020 |
| CN | 111641280 | A | 9/2020 |
| CN | 111740522 | A | 10/2020 |
| CN | 211744173 | U | 10/2020 |
| CN | 112072814 | A | 12/2020 |
| EP | 2216883 | A1 | 8/2010 |
| JP | 2006067777 | A | 3/2006 |
| JP | 2009136040 | A | 6/2009 |
| JP | 2015177706 | A | 10/2015 |
| JP | 2019058048 | A | 4/2019 |
| JP | 2019149859 | A * | 9/2019 |
| JP | 2019170150 | A | 10/2019 |
| JP | 6793178 | B2 | 12/2020 |

OTHER PUBLICATIONS

European Patent Office, Extended European Search Report in EP Application No. 21948016.7, dated Apr. 17, 2025, 7 pages.

International Search Report and Written Opinion for PCT/CN2021/129735, dated Mar. 4, 2022, 9 pages, including English translation of search report.

Japan Patent Office, Notice of Reasons for Refusal in JP Application No. 2023-566505, mailed Oct. 1, 2024, 18 pages including English translation.

China National Intellectual Property Administration, First Office Action in CN Application No. 202110732916.6, mailed Dec. 25, 2025, 22 pages with English translation.

* cited by examiner

102 —
103
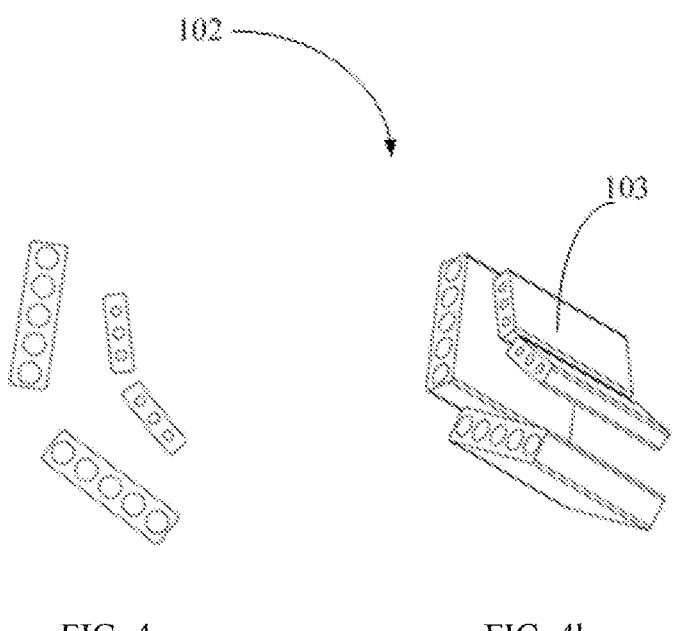
FIG. 4a                    FIG. 4b
102 —
103
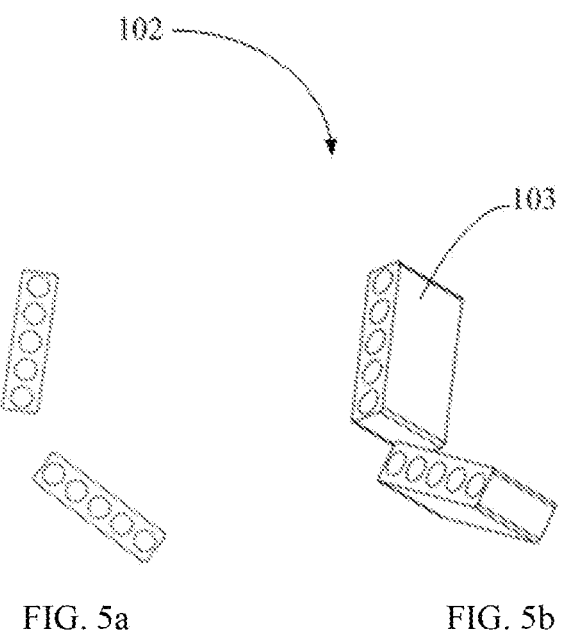
FIG. 5a                    FIG. 5b

ROTOR UNIT, ROTOR, AND MOTOR STRUCTURE

CROSS-REFERENCE TO RELATED APPLICATIONS

The present application is a national phase entry under 35 U.S.C. § 371 of International Application No. PCT/CN2021/129735, filed Nov. 10, 2021, which designates the United States of America, which claims the benefit of priority to Chinese patent application No. 202110732916.6, filed on Jun. 29, 2021, entitled "Rotor Unit, Rotor and Motor Structure", the entire disclosures of which are incorporated herein by reference in their entireties and for all purposes.

TECHNICAL FIELD

The present disclosure relates to the field of automotive manufacturing technology, and more particularly to a rotor unit, a rotor and a motor structure.

BACKGROUND

New energy vehicles require high motor power and high torque to meet good starting acceleration or climbing ability. On the other hand, due to limited space and strict weight requirements of passenger cars, a motor must have high torque and power density. A permanent magnet synchronous motor (PMSM) is widely used in the new energy vehicles due to its excellent speed regulation ability and high torque density. In recent years, with continuous iteration of new energy vehicle electric drive technology, requirements for the highest speed and torque power density of the motor have also increased, which causes problems such as high motor temperature, difficulty in heat dissipation, and high cost for magnets.

At present, new energy motor manufacturers are actively laying out and developing stator flat copper wire winding technology, which can effectively improve the temperature on a stator side of the motor. However, due to an alternating current effect, a flat copper wire will generate significant alternating current losses in a high-speed range, thus reducing temperature rise of the stator and the rotor of a flat wire motor in the high-speed range is particularly important.

In addition, because a flat wire process mostly uses a full-pitch winding, the eddy current loss of the rotor is serious, especially in the high-speed range, the increased eddy current loss will make the temperature of the magnets too high, thus the magnets with higher coercivity grade is required. As the new energy vehicles pursue balance between cost and performance, the price of the magnets account for a large proportion in the whole motor. As the coercivity of the magnets increases, the cost increases as well. Therefore, innovative design is needed to ensure that the cost of the magnets or the motor is also relatively reasonable while parameters such as motor performance and quality meet the requirements.

Therefore, how to effectively reduce the cost of the magnets and take into account the simultaneous direct cooling of the stator and the rotor is a technical problem that needs to be solved urgently.

SUMMARY

The embodiments of the present disclosure provide a rotor unit, a rotor and a motor structure, which can effectively reduce the cost of the magnets, and can achieve a direct cooling of the magnets, the rotor and the stator, reduce the eddy current effect, reduce costs, and greatly expand an optimization and use range of the motors when applied in the motors.

According to an aspect of the present disclosure, a rotor unit is provided. The rotor unit includes: a rotor punching sheet; a plurality of magnet units including a magnet and arranged on the rotor punching sheet; and a hole structure arranged in the magnet.

According to some embodiments, the hole structure extends through the magnet.

According to some embodiments, each magnet unit includes one or more magnets.

According to some embodiments, the hole structure includes one or more selected from a group consisting of a circular hole, a triangular hole, a rectangular hole and other shapes.

According to some embodiments, the hole structure includes a single hole structure or an overlapping hole structure, and when the hole structure includes the overlapping bole structure, the hole structure includes a first hole structure and a second hole structure communicated with each other.

According to another aspect of the present disclosure, a rotor is provided. The rotor includes a plurality of rotor units according to any one of preceding embodiments.

According to another aspect of the present disclosure, a motor structure is provided. The motor structure includes a rotor according to any one of preceding embodiments.

According to another aspect of the present disclosure, a motor structure is provided. The motor structure includes: a rotor according to any one of preceding embodiments, wherein the rotor includes a first rotor group and a second rotor group, and one rotor unit in the first rotor group and one rotor unit in the second rotor group are arranged adjacent to each other; a first flow guide plate having a central hole and arranged between two adjacent rotor units, wherein the first flow guide plate includes a first flow guide path therein; and a central shaft passing through a center of the rotor and the central hole, wherein the central shaft is provided with a flow guide hole, and the flow guide hole, the first flow guide path and the hole structure are communicated with each other.

According to some embodiments, the rotor includes a V-shaped skewed pole structure or a straight-line-shaped skewed pole structure.

According to some embodiments, when the rotor includes the straight-line-shaped skewed pole structure, and the sum of the number of the rotor units in the first rotor group and the number of the rotor units in the second rotor group is odd, the first flow guide plate is arranged in both halves of the rotor unit when any one of the rotor units is cut into two halves.

According to some embodiments, the first flow guide path includes a first flow guide path inlet and a first flow guide path outlet communicated with each other, and the first flow guide path inlet is arranged on a side wall of the center hole.

According to some embodiments, the first flow guide plate further includes a first magnet unit interface extending through the first flow guide plate, and the first flow guide path outlet is arranged corresponding to the first magnet unit interface, wherein a side wall of the first magnet unit interface exposes the first flow guide path outlet, and ends of the magnet units on two sides of the first flow guide plate are arranged at the first magnet unit interface.

According to some embodiments, the first rotor group includes one or a plurality of rotor units, and the second rotor group includes one or a plurality of rotor units.

According to some embodiments, when the first rotor group includes a plurality of rotor units and the second rotor group includes a plurality of rotor units, the motor structure further includes a plurality of interlayer connection plates arranged between adjacent rotor units in the first rotor group and between adjacent rotor units in the second rotor group.

According to some embodiments, each interlayer connection plate includes a second magnet unit interface extending through the interlayer connection plate.

According to some embodiments, the second magnet unit interface is arranged corresponding to the magnet units, and ends of the magnet units on two sides of each interlayer connection plate are arranged at the second magnet unit interface.

According to some embodiments, the motor structure further includes a second flow guide plate arranged at each end of the rotor.

According to some embodiments, the second flow guide plate includes a second flow guide path, and the second flow guide path includes a second flow guide path inlet and a second flow guide path outlet communicated with each other, wherein the second flow guide path inlet is arranged corresponding to the magnet units, and ends of the magnet units are arranged at the second flow guide path inlet.

According to some embodiments, the second flow guide path outlet is arranged on a side wall of the second flow guide plate and uniformly distributed along a circumferential direction of the second flow guide plate.

According to some embodiments, the number of the second flow guide path outlet is a multiple of the number of poles of the rotor.

According to some embodiments, the flow guide hole is arranged corresponding to the first flow guide path inlet.

According to some embodiments, the motor structure further includes a stator assembly arranged outside the rotor, wherein the stator assembly includes a stator core and a plurality of windings on the stator core.

The technical solution of the embodiments of the present disclosure has following beneficial effects:

The rotor unit includes a rotor punching sheet and a plurality of magnet units arranged on the rotor punching sheet, wherein each magnet unit includes a magnet having a hole structure. On the one hand, due to the hole structure in the magnet, the amount of the magnet used is reduced and the cost is reduced. Moreover, due to the presence of the hole structure, a diffusion process can be used for the production of the magnet, which can also reduce costs. On the other hand, due to the presence of the hole structure, an eddy current path in the magnet is suppressed to a certain extent, thereby reducing the eddy current loss. Moreover, the hole structure can further reduce the harmonics generated by the rotor through optimization and combinations.

Furthermore, the motor structure includes a rotor having a plurality of rotor units. Due to the hole structure in the magnet in the rotor units, the hole structure can reduce the amount of the magnet used to form the rotor, suppress the eddy current effects, improve the operating efficiency of the motor, and can also serve as a channel for direct cooling of the magnet.

Furthermore, the motor structure includes a rotor and a first flow guide plate, and the rotor includes a first rotor group and a second rotor group. One rotor unit in the first rotor group and one rotor unit in the second rotor group are arranged adjacent to each other. The first flow guide plate includes a central hole and is arranged between the two adjacent rotor units. The central shaft passes through the center of the rotor and the central hole, and the central shaft is provided with a flow guide hole. The flow guide hole, the first flow guide path and the hole structure are communicated with each other. With this arrangement, when a coolant is fed into the central shaft of the motor structure, as the flow guide hole, the first flow guide path and the hole structure are communicated with each other, the coolant can flow out of the central shaft, pass through the flow guide hole, the first flow guide path, and enter the hole structure in the magnet, thereby achieving rapid cooling of the magnet and the rotor.

Furthermore, the second magnet unit interface is arranged corresponding to the magnet units, and the ends of the magnet units on two sides of the interlayer connection plate are located in the second magnet unit interface. The interlayer connection plate realizes the connection between the rotor units on two sides. As the second magnet unit interface on the interlayer connection plate is arranged corresponding to the magnet units, the second magnet unit interface extends through the interlayer connection plate to form a communication between the magnet units on two sides of the interlayer connection plate, so that the coolant flowing out of the first flow guide plate can flow through the interlayer connection plate to cool the rotor units on two sides of the interlayer connection plate, thereby cooling the magnet and the rotor, reducing the temperature effect generated by the motor structure during operation, and reducing energy consumption.

Furthermore, the second flow guide plate includes a second flow guide path. The second flow guide path includes a second flow guide path inlet and a second flow guide path outlet communicated with each other. The second flow guide path inlet is arranged corresponding to the magnet units, and the ends of the magnet units are located in the second flow guide path inlet. The coolant in the magnet enters the second flow guide path inlet and then flows out of the second flow guide outlet, thereby cooling the stator core and the windings in the motor, significantly reducing the temperature generated during operation of the motor, and improving the heat dissipation ability and performance of the motor structure.

BRIEF DESCRIPTION OF THE DRAWINGS

FIG. 4 illustrates a schematic structural view of a magnet unit according to an embodiment of the present disclosure; FIG. 4a is a schematic plan view and FIG. 4b is a schematic perspective view corresponding to FIG. 4a;

FIG. 5 illustrates a schematic structural view of a magnet unit according to another embodiment of the present disclosure; FIG. 5a is a schematic plan view and FIG. 5b is a schematic perspective view corresponding to FIG. 5a;

FIG. 6 illustrates a schematic structural view of a magnet unit according to another embodiment of the present disclosure; FIG. 6a is a schematic plan view and FIG. 6b is a schematic perspective view corresponding to FIG. 6a;

FIG. 7 illustrates a schematic structural view of a magnet unit according to another embodiment of the present disclosure; FIG. 7a is a schematic plan view and FIG. 7b is a schematic perspective view corresponding to FIG. 7a;

FIG. 8 illustrates a schematic structural view of a magnet unit according to another embodiment of the present disclosure.

FIG. 9 illustrates a schematic structural view of a magnet unit according to another embodiment of the present disclosure.

FIG. 10 illustrates a schematic structural view of a magnet unit according to another embodiment of the present disclosure.

DETAILED DESCRIPTION

Figure 1:
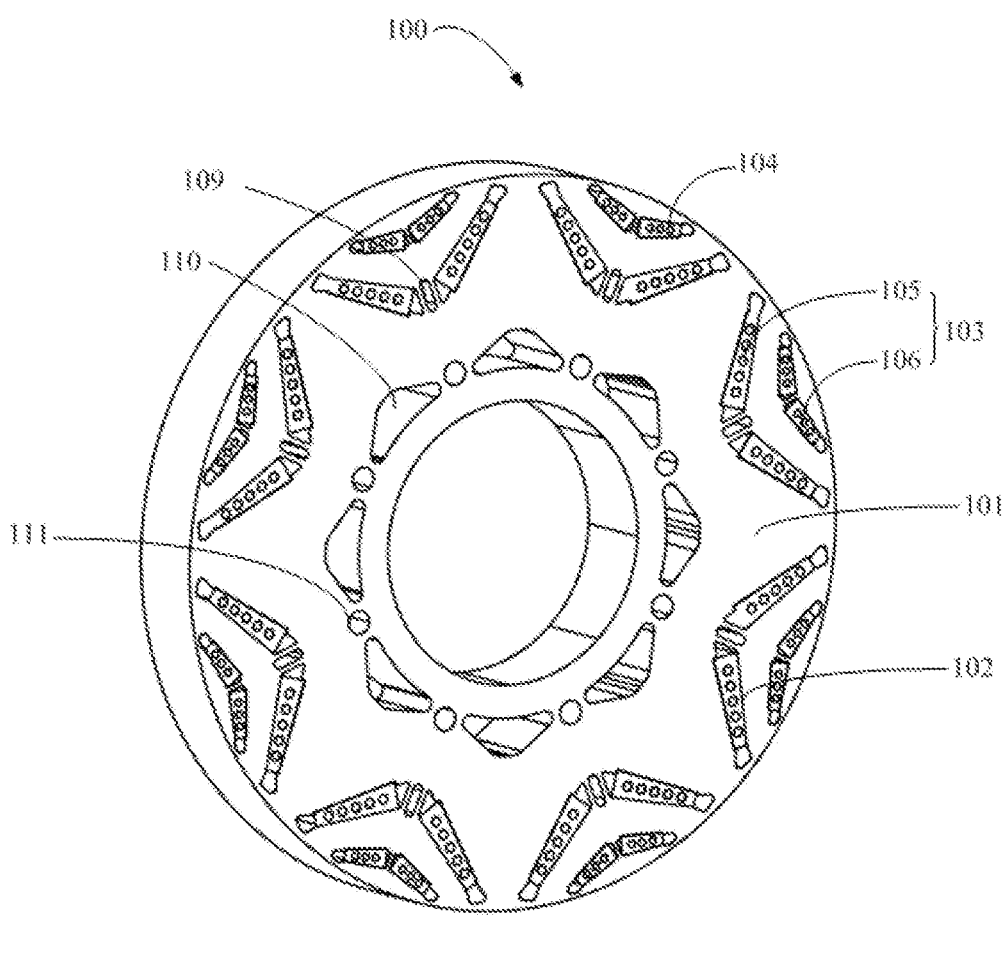
FIG. 1 illustrates a schematic structural view of a rotor unit according to an embodiment of the present disclosure.

Currently, commonly used methods for reducing motor temperature rise are mainly divided into two categories: reducing motor losses or improving heat dissipation capacity of the motor. Reducing motor losses is mainly achieved by optimizing the electromagnetic design of the motor, such as selecting a silicon steel plate with lower iron losses, increasing copper consumption, optimizing the stator and rotor structure to reduce harmonic content, etc. The main way to improve the heat dissipation capacity of the motor is to optimize its cooling method. Generally, the heat dissipation capacity of the cooling methods, from high to low, is as follows: water cooled or oil cooled comprehensive cooling of the stator and rotor, single water cooling of the stator, and natural or forced air cooling.

Various design methods or structures have been proposed for the above cooling methods, especially for water cooled or oil cooled comprehensive cooling of the stator and the rotor. However, these cooling methods and structures can only partially cool the stator core and the ends of the windings, or involve spray systems with complex cooling structures that cannot guarantee the uniformity of the cooling effect of the entire motor, especially the magnet, and the cooling effect of the magnet is limited, and the overall cost of the entire motor is too high.

Therefore, a hole structure is arranged in the magnet. On the one hand, due to the hole structure in the magnet, the amount of the magnet used is reduced and the cost is reduced. Moreover, due to the presence of the hole structure, the eddy current path in the magnet is suppressed to a certain extent, thereby reducing the loss of the magnet. At the same time, the design of the hole structure is very conducive to the production and implementation of an infiltration process of the magnet, especially for the magnet with large thickness, which can effectively solve impermeable problems, and avoid the uneven distribution of coercivity in a thickness direction of the magnet.

The motor structure includes a rotor, and the rotor includes a plurality of rotor units. Due to the hole structure in the magnet in the rotor unit, the reasonable layout design of these hole structures can reduce the harmonic magnetic electromotive force generated by the rotor of the motor to a certain extent, thereby optimizing motor losses and electromagnetic force.

The motor structure includes a rotor and a first flow guide plate, and the rotor includes a first rotor group and a second rotor group. One rotor unit in the first rotor group and one rotor unit in the second rotor group are arranged adjacent to each other. The first flow guide plate includes a central hole and is arranged between the two rotor units arranged adjacent to each other. The central shaft passes through the center of the rotor and the central hole, and the central shaft is provided with a flow guide hole. The flow guide hole, the first flow guide path and the hole structure are communicated with each other. With this arrangement, when a coolant is fed into the central shaft of the motor structure, as the flow guide hole, the first flow guide path and the hole structure are communicated with each other, the coolant can flow out of the central shaft, pass through the flow guide hole, the first flow guide path, and enter the hole structure in the magnet, thereby achieving rapid cooling of the magnet and the rotor.

In order to make the above objectives, features, and advantages of the present disclosure more apparent and understandable, specific embodiments of the present disclosure will be explained below in detail in conjunction with the accompanying drawings.

Figure 2:
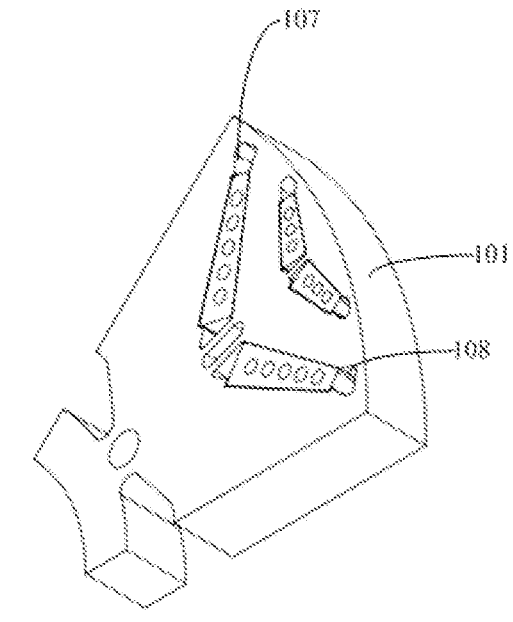
FIG. 2 illustrates a schematic structural view of ⅛ rotor unit in FIG. 1.
Figure 3:
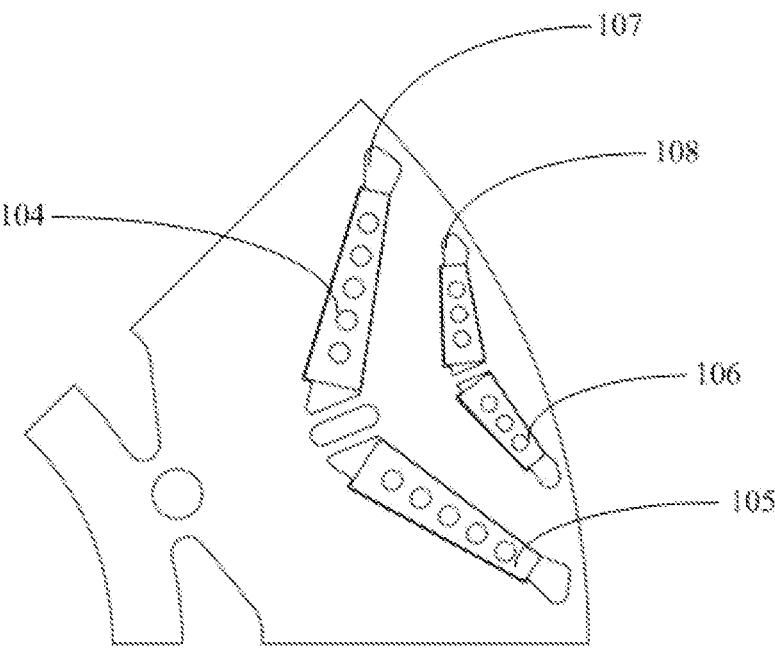
FIG. 3 is a front view of FIG. 2.
Figures 6A, 6B:
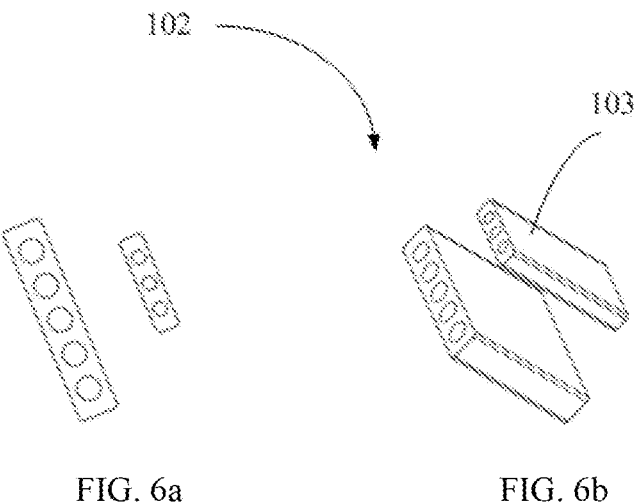
Figures 7A, 7B:
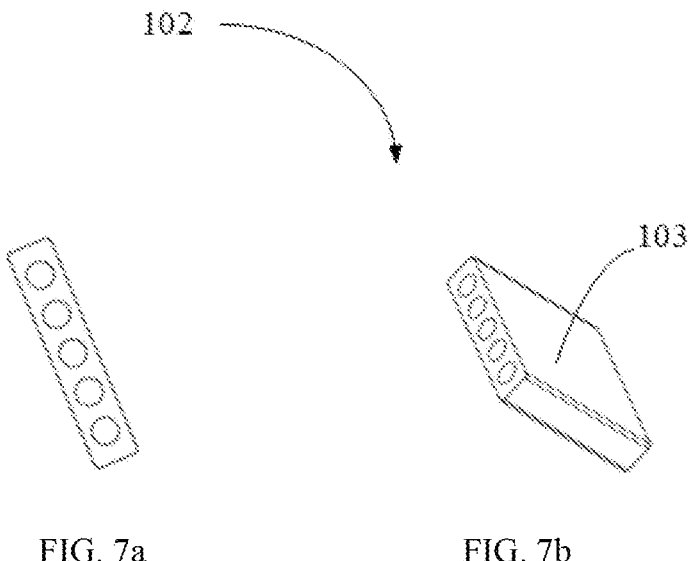
Figures 8A, 8B:
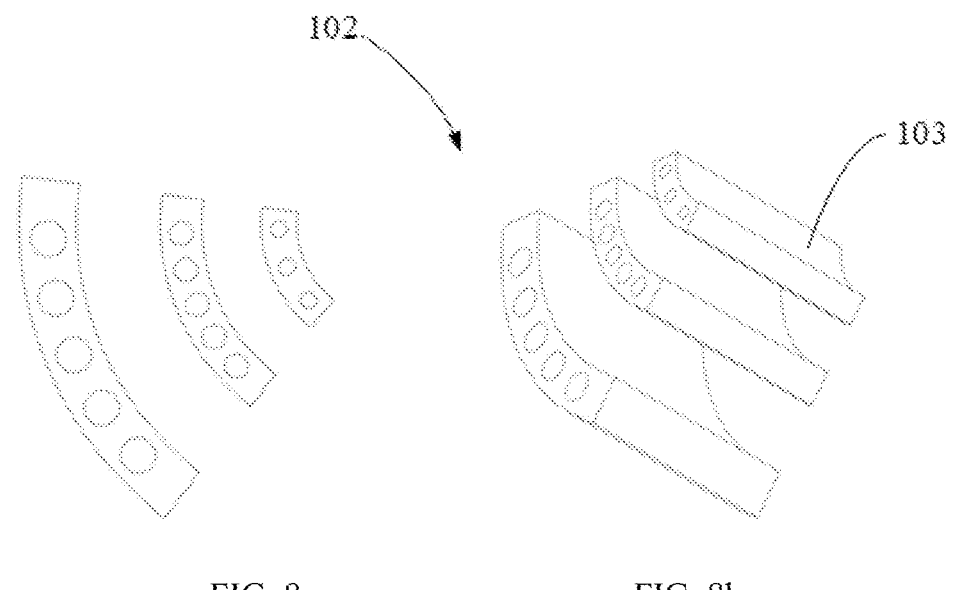
FIG. 8*a* is a schematic plan view and FIG. 8*b* is a schematic perspective view corresponding to FIG. 8*a;*
Figures 9A, 9B:
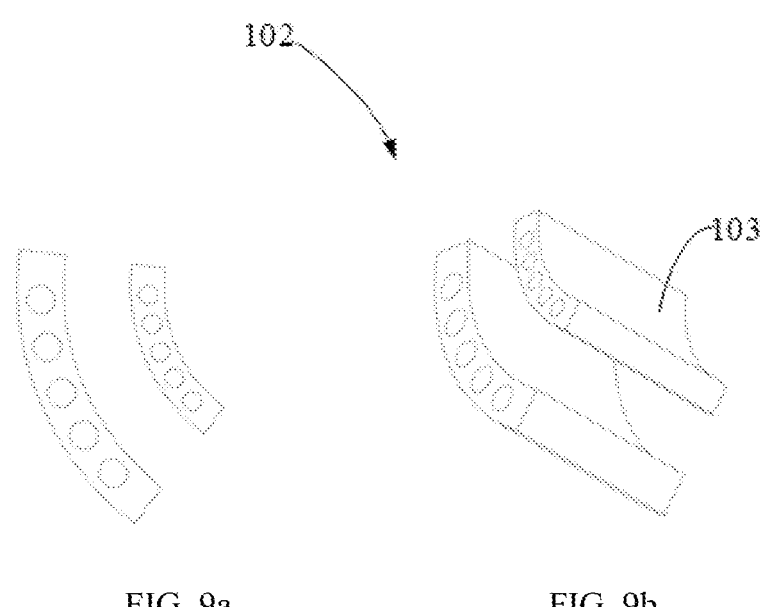
FIG. 9*a* is a schematic plan view and FIG. 9*b* is a schematic perspective view corresponding to FIG. 9*a;*
Figures 10A, 10B:
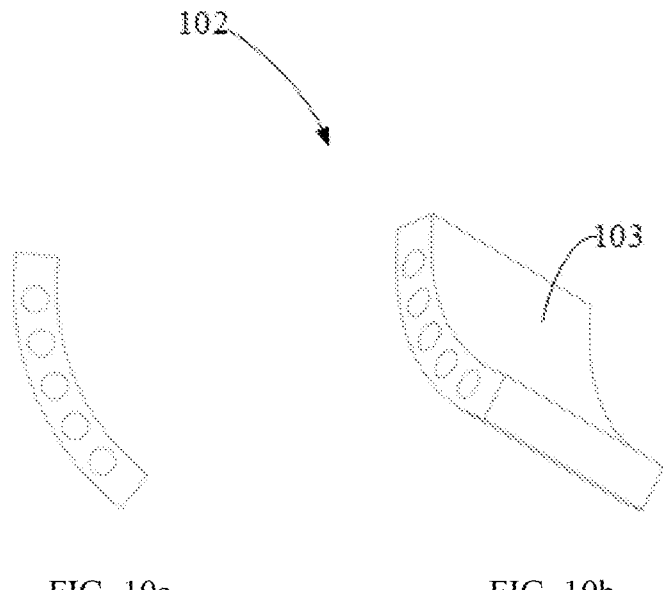
FIG. 10*a* is a schematic plan view and FIG. 10*b* is a schematic perspective view corresponding to FIG. 10*a;*

FIG. 1 illustrates a schematic structural view of a rotor unit according to an embodiment of the present disclosure; FIG. 2 illustrates a schematic structural view of ⅛ rotor unit in FIG. 1; FIG. 3 is a front view of FIG. 2; FIG. 4 illustrates a schematic structural view of a magnet unit according to an embodiment of the present disclosure; FIG. 4*a* is a schematic plan view and FIG. 4*b* is a schematic perspective view corresponding to FIG. 4*a*; FIG. 5 illustrates a schematic structural view of a magnet unit according to another embodiment of the present disclosure; FIG. S*a* is a schematic plan view and FIG. 5*b* is a schematic perspective view corresponding to FIG. 5*a*; FIG. 6 illustrates a schematic structural view of a magnet unit according to another embodiment of the present disclosure; FIG. 6*a* is a schematic plan view and FIG. 6*b* is a schematic perspective view corresponding to FIG. 6*a*; FIG. 7 illustrates a schematic structural view of a magnet unit according to another embodiment of the present disclosure; FIG. 7a is a schematic plan view and FIG. 7b is a schematic perspective view corresponding to FIG. 7a; FIG. 8 illustrates a schematic structural view of a magnet unit according to another embodiment of the present disclosure; FIG. 8a is a schematic plan view and FIG. 8b is a schematic perspective view corresponding to FIG. 8a; FIG. 9 illustrates a schematic structural view of a magnet unit according to another embodiment of the present disclosure; FIG. 9a is a schematic plan view and FIG. 9b is a schematic perspective view corresponding to FIG. 9a; FIG. 10 illustrates a schematic structural view of a magnet unit according to another embodiment of the present disclosure; FIG. 10a is a schematic plan view and FIG. 10b is a schematic perspective view corresponding to FIG. 10a.

Referring to FIGS. 1 to 3, a rotor unit 100 includes a rotor punching sheet 101 and a magnet unit 102.

The magnet unit 102 includes magnets 103 and is arranged on the rotor punching plate 101.

A hole structure 104 is arranged in the magnets 103.

In some embodiments, the hole structure 104 is arranged in the magnets 103. The arrangement of the hole structure 104 can not only effectively reduce the material consumption to form the magnets 103, but also provide a channel for direct cooling of the magnets 103, and reduce the eddy current loss of the magnets 103 to a certain extent.

In some embodiments, the magnets 103 are inserted into the rotor punching sheet 101.

FIG. 2 shows a process for inserting the magnets 103 into the rotor punching sheet 101.

In some embodiments, as current permanent magnet motor for vehicles is made of sintered Neodymium Iron Boron magnet, in order to obtain higher temperature resistance, higher intrinsic coercivity is required. Generally, in order to obtain higher intrinsic coercivity, the content of heavy rare earth dysprosium or terbium needs to be increased in the raw material formula, especially in the magnet formula of traditional production process. The magnets with the hole structure, due to its reduced eddy current loss and the ability to be directly cooled, will have a lower maximum temperature, indicating a lower demand for high-temperature resistance. Therefore, the original use of these heavy rare earth elements can be reduced or even eliminated, and the reduction in raw material costs for the production of the magnets will further reduce the total cost of the magnets.

In some embodiments, due to the presence of the hole structure 104, the heavy rare earth slurry or target material can directly enter the interior of the magnets, which can effectively overcome the gradient problem after permeation, improve the permeation effect, and reduce the difficulty of permeation. This is because in practical applications, the magnets will be modified by a permeation process. This process is based on a magnet substrate of low coercivity grade, with a surface coated heavy rare earth slurry or using the target material magnetron sputtering method, making use of microstructure characteristics of neodymium iron boron materials to allow heavy rare earth elements to permeate into a grain boundary, thereby improving the overall anti-demagnetization performance of the magnets. This new production process can still achieve the same high resistance to demagnetization while reducing the use of heavy rare earth materials, making it widely popular. However, this process has certain requirement for the thickness of the orientation direction of the magnets. For too thick magnets, due to a limited permeation depth, the resistance to demagnetization will exhibit a certain gradient phenomenon.

In certain extreme cases, the improvement of the resistance to demagnetization in the middle part of the magnets is very limited, and the presence of the hole structure provides opportunities for a better permeation.

In some embodiments, the hole structure 104 extends through the magnets 103.

In some embodiments, the hole structure 104 can not only serve as a flow channel for subsequent coolant and an inlet for the permeation process, but also achieve cutting of magnetic field lines to reduce the generation of eddy currents.

In some embodiments, the magnets 103 are provided with a plurality of bole structures 104 forming a honeycomb shape.

In some embodiments, the magnets 103 are provided with a single hole structure 104.

In some embodiments, the hole structure 104 includes a circular hole.

In some embodiments, the hole structure 104 may also include one or more shapes selected from a group consisting of a circular hole, a triangular hole and a rectangular hole.

In some embodiments, the hole structure 104 includes a single hole.

In some embodiments, the hole structure 104 also includes an overlapping hole structure. When the hole structure includes an overlapping hole structure, the hole structure includes a first hole structure and a second hole structure, and the first hole structure and the second hole structure are communicated with each other.

When the hole structure includes an overlapping hole structure, the number of the first hole structure and the number of the second hole structure may be consistent or inconsistent.

When the hole structure includes an overlapping hole structure, the first hole structure does not extend through the entire interior of the magnets, and the second hole structure does not extend through the entire interior of the magnets. Instead, the first hole structure and the second hole structure are communicated with each other and extend through the entire interior of the magnets. The first hole structure and the second hole structure are formed by layer arrangement in the magnets.

The first hole structure and the second hole structure may have a single hole structure or an overlapping hole structure. For example, the hole structure includes a first hole structure and an N-th hole structure (N≥2), where the first hole structure and the N-th hole structure are communicated with each other, and the communication may be direct or indirect, and the communication direction may be in any direction or directions along length, width, or thickness.

Referring to FIGS. 2 and 3, the magnet unit 102 includes the magnets 103.

In some embodiments, there are eight magnet units 102 uniformly distributed on the rotor punching plate 101 along the central hole of the rotor unit in the circumferential direction.

In other embodiments, there are six, four or any other number of magnet units 102.

In some embodiments, the height of the magnets 103 is the same as the thickness of the rotor punching sheet 101, that is, after the magnets 103 are inserted into the rotor punching sheet 101, the plane of the magnets 103 is flush with the plane of the rotor punching sheet 101.

In other embodiments, the height of the magnets 103 may also be less than the thickness of the rotor punching sheet 101, that is, after the magnets 103 are inserted into the rotor punching sheet 101, the plane of the magnets 103 is lower than the plane of the rotor punching sheet 101.

In some embodiments, the magnet unit 102 is clamped to the rotor punching sheet, that is, magnet grooves are opened on the rotor punching sheet, and the magnets 103 are clamped into the magnet grooves.

In some embodiments, the magnet unit 102 includes a plurality of magnets.

In some embodiments, the magnet unit includes one magnet.

FIG. 4 illustrates a schematic structural view of a magnet unit according to an embodiment of the present disclosure; FIG. 4*a* is a schematic plan view, and FIG. 4*b* is a schematic perspective view corresponding to FIG. 4*a*.

Referring to FIGS. 1 and 3, in some embodiments, the magnets 103 include a first magnet 105 and a second magnet 106. The first magnet 105 and the second magnet 106 may have different sizes.

In some embodiments, the magnet grooves correspond to a magnet groove 107 of the first magnet 105 and a magnet groove 108 of the second magnet 106.

In some embodiments, there are two first magnets 105. In other embodiments, there is one, three or any other number of first magnets 105, which can be designed according to actual needs.

In some embodiments, the two first magnets 105 are arranged in a V-shaped arrangement. In other embodiments, the first magnets can also be arranged in a W-shaped arrangement, a straight-line-shaped arrangement, etc.

In some embodiments, there are two second magnets 106. In other embodiments, there is one, three or any other number of second magnets 106, which can be designed according to actual needs.

In some embodiments, the two second magnets 106 are arranged in a V-shaped arrangement. In other embodiments, the second magnets can also be arranged in a W-shaped arrangement, a straight-line-shaped arrangement, etc.

FIG. 5 illustrates a schematic structural view of a magnet unit according to another embodiment of the present disclosure, FIG. 5a is a schematic plan view, and FIG. 5*b* is a schematic perspective view corresponding to FIG. 5*a*.

FIG. 6 illustrates a schematic structural view of a magnet unit according to another embodiment of the present disclosure, FIG. 6*a* is a schematic plan view, and FIG. 6*b* is a schematic perspective view corresponding to FIG. 6*a*.

FIG. 7 illustrates a schematic structural view of a magnet unit according to another embodiment of the present disclosure, FIG. 7*a* is a schematic plan view, and FIG. 7*b* is a schematic perspective view corresponding to FIG. 7*a*.

FIG. 8 illustrates a schematic structural view of a magnet unit according to another embodiment of the present disclosure, FIG. 8*a* is a schematic plan view, and FIG. 8*b* is a schematic perspective view corresponding to FIG. 8*a*.

FIG. 9 illustrates a schematic structural view of a magnet unit according to another embodiment of the present disclosure, FIG. 9*a* is a schematic plan view, and FIG. 9*b* is a schematic perspective view corresponding to FIG. 9*a*.

FIG. 10 illustrates a schematic structural view of a magnet unit according to another embodiment of the present disclosure, FIG. 10*a* is a schematic plan view, and FIG. 10*b* is a schematic perspective view corresponding to FIG. 10*a*.

Still referring to FIG. 1, an elliptical hole 109 is arranged between the two first magnets.

The elliptical hole 109 serves as a hole at the flux barrier area.

The rotor punching plate 101 is also provided with a first weight reducing hole 110 and a second weight reducing hole 111.

Referring to FIG. 11, a rotor 200 includes a plurality of rotor units 100.

Figures 11A, 11B:
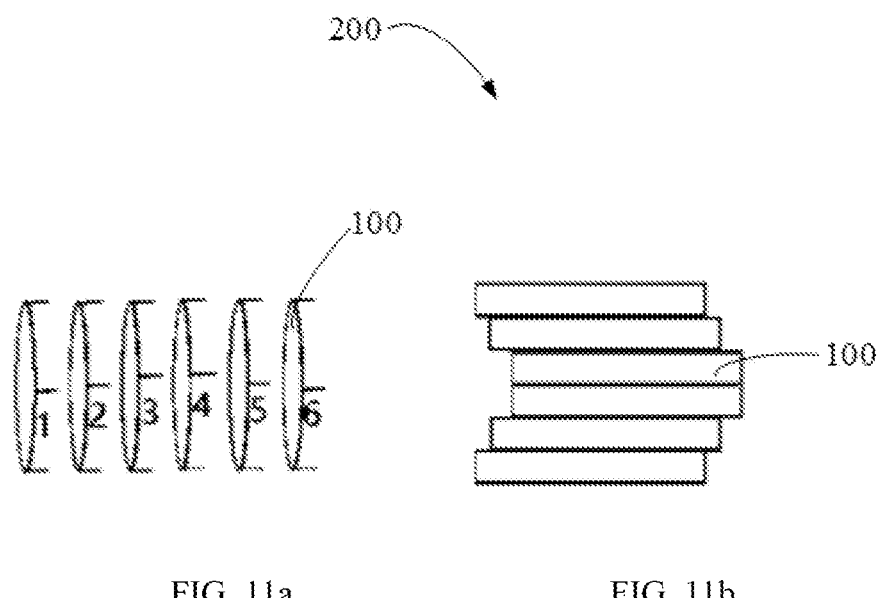
FIG. 11 illustrates a schematic structural view of a step skewed pole of a rotor according to an embodiment of the present disclosure.

FIG. 11*a* illustrates a schematic view of the rotor in an axial direction, and FIG. 11*b* illustrates a schematic view of the rotor in a circumferential direction.

In some embodiments, the rotor 200 includes a step skewed pole structure.

In other implementations, the rotor may not have a step skewed pole structure.

In some embodiments, as the rotor includes a step skewed pole, physical position angles of the two middle rotor punching sheets are the same, and the other adjacent rotor punching sheets will have a mechanical angle shift of 2.5 degrees in the circumferential direction.

In some embodiments, there are six rotor units 100.

In other embodiments, there are five, eight or any other number of rotor units.

In some embodiments, the rotor includes a V-shaped structure in the circumferential direction.

In other embodiments, the rotor includes a straight-line-shaped structure in the circumferential direction, which can be designed according to actual requirements.

Figure 12:
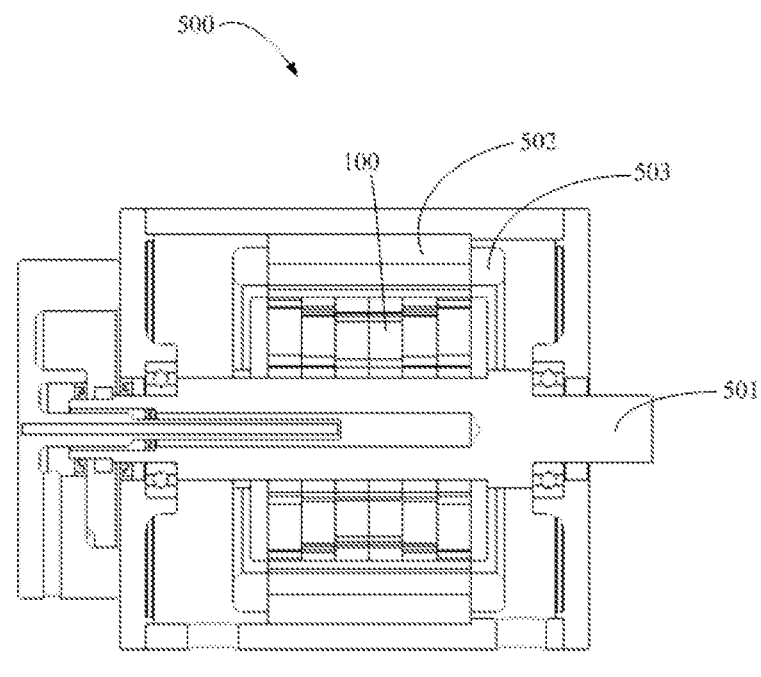
FIG. 12 illustrates a schematic axial cross-sectional view of a motor structure according to an embodiment of the present disclosure.

Referring to FIG. 12, a motor structure 500 includes the rotor 200.

The rotor 200 includes a plurality of rotor units 100.

In some embodiments, the rotor 200 is provided with the hole structure 104, which can reduce the amount of the magnets used to form the rotor, achieve cutting of magnetic field lines during the operation of the motor, and can reduce eddy current effects, reduce the energy loss, and improve the operating efficiency of the motor.

In some embodiments, the motor structure 500 further includes a central shaft 501, a stator core 502 and a plurality of windings 503.

The central shaft 501, the stator core 502, the windings 503, a housing, an oil inlet pipeline, an oil inlet, an oil outlet, and the other components that make up the motor structure 500 are all existing, which will not be explained one by one here.

Figure 13:
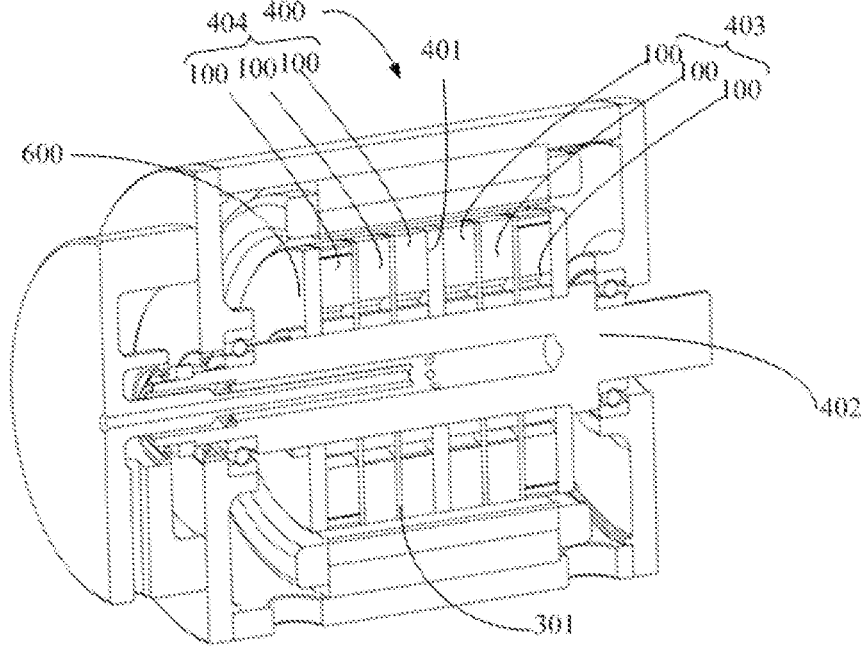
FIG. 13 illustrates a schematic axial cross-sectional view of a motor structure according to another embodiment of the present disclosure.
Figure 14:
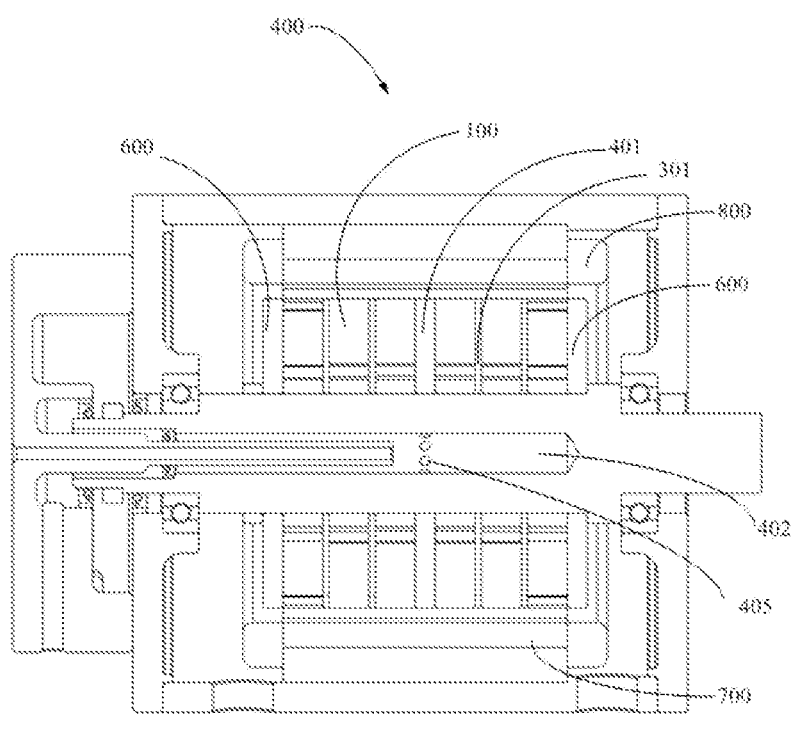
FIG. 14 illustrates a front view of FIG. 13.
Figure 15:
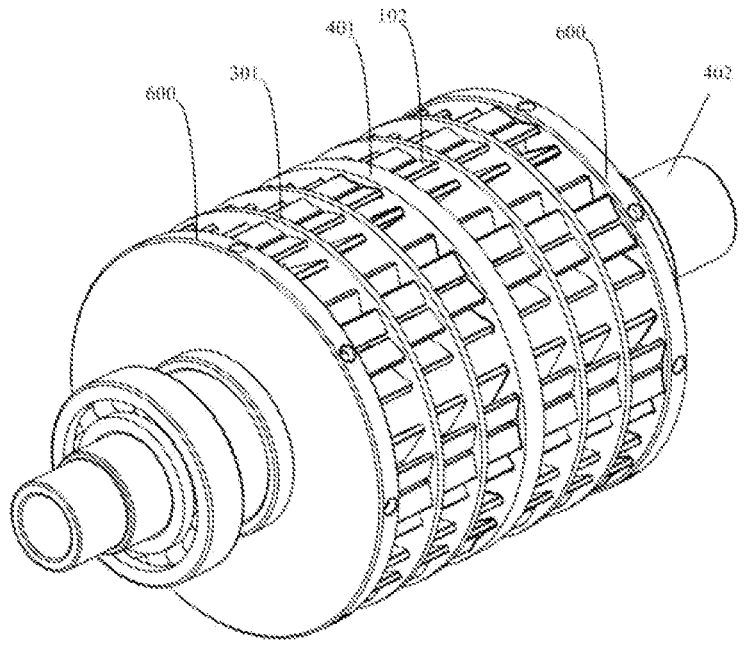
FIG. 15 illustrates a schematic structural view of FIG. 13, wherein components outside the rotor are omitted.

Referring to FIGS. 13 to 15, a motor structure 400 includes a rotor 200, a first flow guide plate 401, and a central shaft 402.

In order to highlight the arrangement relationship of the magnets, some rotor punching sheets are omitted in FIG. 15.

The rotor 200 includes a first rotor group 403 and a second rotor group 404, and one rotor unit 100 in the first rotor group 403 and one rotor unit 100 in the second rotor group 404 are arranged adjacent to each other.

The first flow guide plate 401 includes a central hole 409 and is arranged between the two adjacent rotor units 100.

The central shaft 402 passes through the center of the rotor and the central hole 409. The central shaft 402 includes a flow guide hole 405, and the flow guide hole 405, the first flow guide path, and the hole structure 104 are communicated with each other.

In some embodiments, the first rotor group 403 may include a plurality of rotor units 100, and the second rotor group 404 may include a plurality of rotor units 100.

In other embodiments, the first rotor group 403 may include one rotor unit 100, and the second rotor group 404 may include one rotor unit 100.

In some embodiments, the number of the rotor units 100 in the first rotor group 403 is the same as the number of the rotor units 100 in the second rotor group 404.

In other embodiments, the number of the rotor units 100 in the first rotor group 403 may differ from the number of the rotor units 100 in the second rotor group 404.

In some embodiments, the first flow guide path is arranged in the first flow guide plate 401 and includes a first flow guide path inlet 406 and a first flow guide path outlet 408. The first flow guide path inlet 406 is arranged on the side wall of the center hole 409, and the first flow guide path outlet 408 is arranged corresponding to the magnet units.

In some embodiments, when the coolant enters the central shaft 402, the coolant flows out from the flow guide hole 405 to the first flow guide path in the first flow guide plate 401, and enters from the first flow guide path inlet to the first flow guide path outlet 408. The first flow guide path outlet 408 corresponds to the magnet units 102. With the hole structure 104 in the magnets, the coolant flows from the first flow guide path outlet 408 to the hole structure 104, thereby achieving cooling effect in the magnets.

In some embodiments, as the high temperature resistant magnets generally needs to adopt a higher coercivity grade, more heavy rare earths need to be applied. Therefore, with the oil cooling design of the rotor, the coercivity grade of the magnets can be reduced to achieve a preliminary cost reduction.

In some embodiments, the magnets have a special hole digging design, which ensures the direct cooling effect of the magnets and further reduces the amount of the magnets used while ensuring the performance of the motor, achieving a secondary cost reduction. At the same time, after optimizing the magnets by the hole digging design, the rotor design is lightweight, and the eddy current loss of the magnets is reduced, which can reduce the heat source and improve the operating efficiency of the motor. After the temperature of the rotor decreases, there is also a certain improvement in the yield resistance of the motor at the highest speed.

In some embodiments, the rotor 200 includes a V-shaped skewed pole structure.

In other embodiments, the rotor 200 may also have a straight-line-shaped skewed pole structure. When the rotor 200 includes a straight-line-shaped skewed pole structure, and the sum of the number of the rotor units 100 in the first rotor group 403 and the number of rotor units 100 in the second rotor group 404 are even, the optimal design of the first flow guide plate 401 is to be designed in the middle part of the rotor 200, that is, one side of the first flow guide plate 401 is the first rotor group 403, and the other side is the second rotor group 404.

In other embodiments, the first flow guide plate 401 may also be arranged between two adjacent rotor units 100 in the first rotor group 403, or between two adjacent rotor units 100 in the second rotor group 404.

When the rotor 200 includes a straight-line-shaped skewed pole structure, and the sum of the number of the rotor units 100 in the first rotor group 403 and the number of the rotor units 100 in the second rotor group 404 are odd, the rotor unit located at the center of the rotor 200 is cut into two relatively thin sub rotor units, and the first flow guide plate 401 is located between the two relatively thin sub rotor units.

In other embodiments, when the rotor 200 includes a straight-line-shaped skewed pole structure, and the sum of the number of the rotor units 100 in the first rotor group 403 and the number of the rotor units 100 in the second rotor group 404 are odd, any rotor unit located in the rotor 200 is cut into two relatively thin sub rotor units, and the first flow guide plate 401 is located between the two relatively thin sub rotor units.

Figure 16:
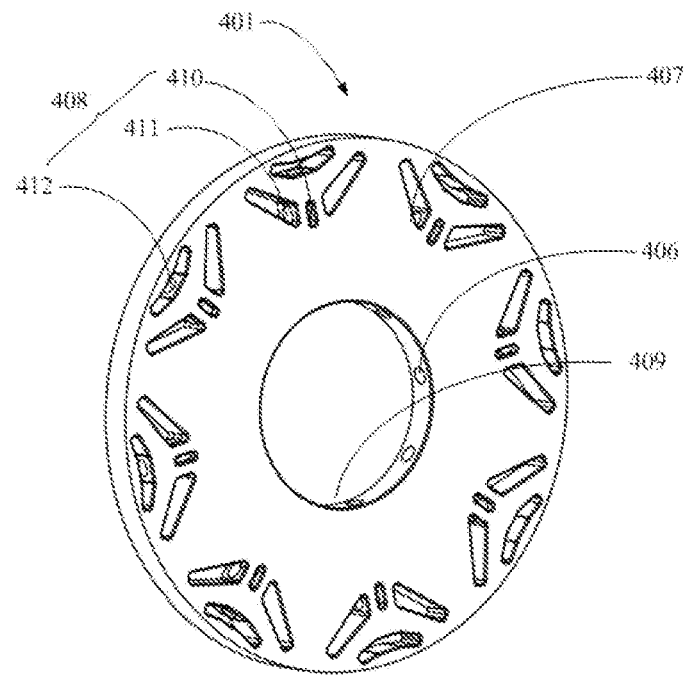
FIG. 16 illustrates a schematic structural view of a first flow guide plate according to an embodiment of the present disclosure.
Figure 17:
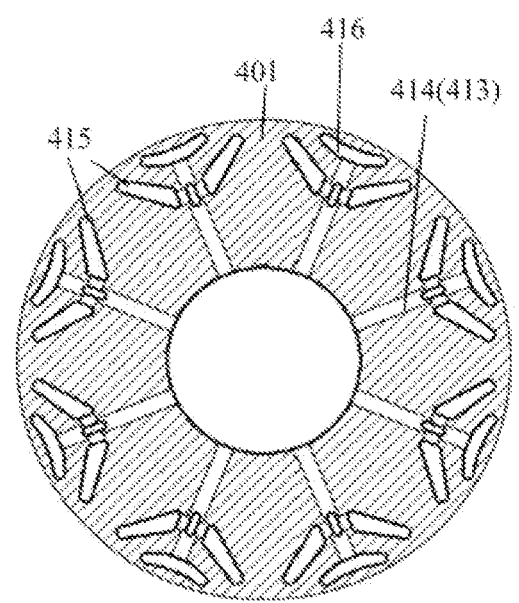
FIG. 17 illustrates a schematic cross-sectional view of FIG. 16.

Referring to FIGS. 16 to 17, the first flow guide plate 401 is shown.

In some embodiments, the first flow guide plate 401 also includes a first magnet unit interface 407, and the first magnet unit interface 407 extends through the first flow guide plate 401. The side wall of the first magnet unit interface 407 exposes the first flow guide path outlet 408, and the ends of the magnet units on two sides of the first flow guide plate are located at the first magnet unit interface.

In some embodiments, the first flow guide path outlet 408 includes a flux barrier flow guide outlet 410, a first magnet flow guide outlet 411 and a second magnet flow guide outlet 412.

In some embodiments, the side wall of the first magnet unit interface 407 exposes the first magnet flow guide outlet 411 and the second magnet flow guide outlet 412, and the flux barrier flow guide outlet 410 is located in the hole at the flux barrier area.

In some embodiments, the first flow guide path 413 includes a radial flow guide path 414, a first magnet flow guide path 415 and a second magnet flow guide path 416. The first magnet flow guide path 415 is symmetrically distributed on two sides of the radial flow guide path, and the second magnet flow guide path 416 is symmetrically distributed on two sides of the radial flow guide path 414.

In some embodiments, the first flow guide path inlet 406 corresponds to the first flow guide path 413. Specifically, the first flow guide path inlet corresponds to the radial flow guide path. The first flow guide path inlet is located at the end of the radial flow guide path.

In some embodiments, the first flow guide path inlet 406 is arranged corresponding to the flow guide hole 405.

In some embodiments, the side wall of the first magnet unit interface 407 exposes the first magnet flow guide outlet 411 and the second magnet flow guide outlet 412.

Figure 18:
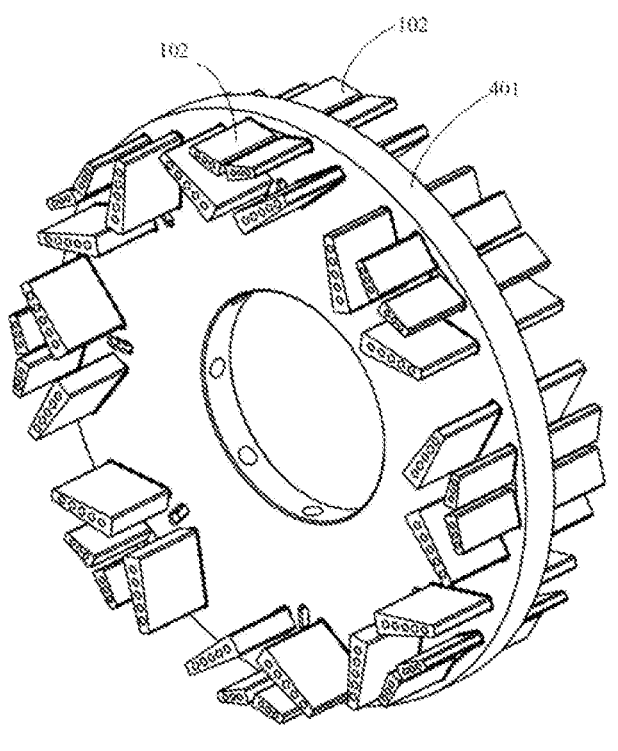
FIG. 18 illustrates a schematic structural view showing a relationship between a first flow guide plate and magnet units on two sides according to an embodiment of the present disclosure.

FIG. 18 illustrates a relationship between the first flow guide plate 401 and the magnet units on both sides.

Figure 19:
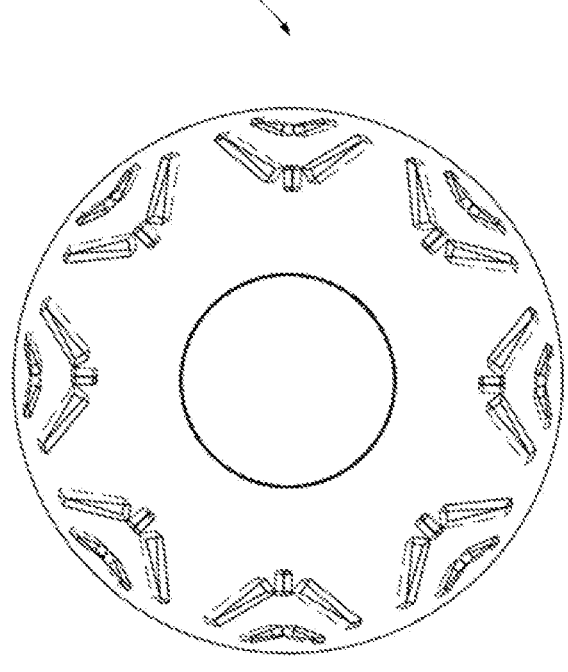
FIG. 19 illustrates a schematic structural view of an interlayer flow guide plate according to an embodiment of the present disclosure.
Figure 20:
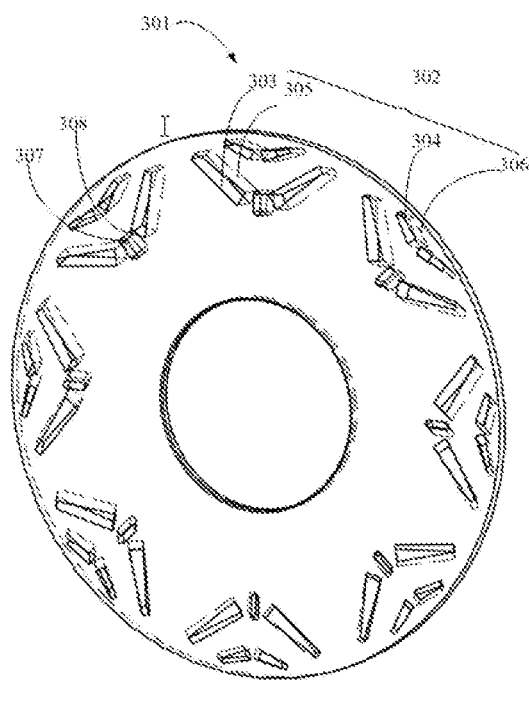
FIG. 20 illustrates a schematic perspective view of FIG. 19.

Referring to FIGS. 19 and 20, an interlayer connection plate 301 is shown.

The interlayer connection plate 301 includes a second magnet unit interface 302, and the second magnet unit interface 302 extends through the interlayer connection plate.

In some embodiments, the second magnet unit interface 302 extends through the interlayer connection plate, and the rotor 200 includes a skewed pole structure. The hole structures in two adjacent rotor units 100 are inclined at a certain angle, so that the hole structures between the two adjacent rotor units 100 can be communicated using the second magnet unit interface 302 on the interlayer connection plate 301, thereby realizing the flowing of the coolant.

The interlayer connection plate includes a front side and a back side, and the second magnet unit interface located on the front side of the interlayer connection plate includes a first magnet front interface 303 and a second magnet front interface 304. The second magnet unit interface located on the back side of the interlayer connection plate includes a first magnet back interface 305 and a second magnet back interface 306.

The second magnet unit interface 302 is arranged corresponding to the magnet units 102, and the ends of the magnet units on both sides of the interlayer connection plate are located in the second magnet unit interface.

Figure 21:
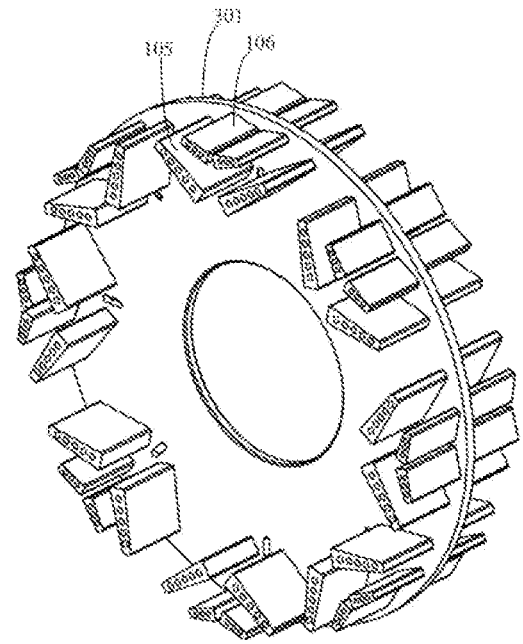
FIG. 21 illustrates a schematic structural view showing a relationship between an interlayer flow guide plate and magnet units on two sides according to an embodiment of the present disclosure.

Referring to FIG. 21, in some embodiments, the end of the first magnet and the end of the second magnet on the front side of the interlayer connection plate are respectively located at the first magnet front interface 303 and the second magnet front interface 304. The end of the first magnet and the end of the second magnet located on the back side of the interlayer connection plate are respectively located at the first magnet back interface 305 and the second magnet back interface 306.

Figure 22:
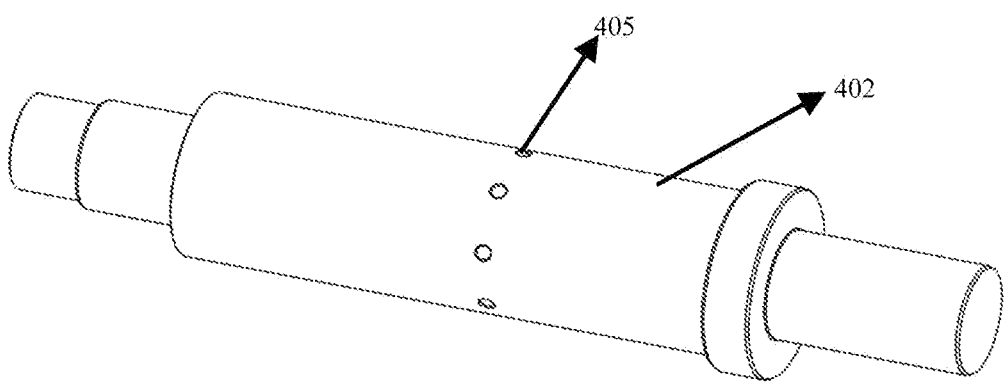
FIG. 22 illustrates a schematic structural view of a central shaft according to an embodiment of the present disclosure.

Referring to FIG. 22, the central shaft 402 is shown.

The central shaft 402 is a hollow shaft, and flow guide holes 405 are arranged on the central shaft 402. The flow guide holes 405 are used to diffuse the coolant in the central shaft 402 outwards and transfer it to the surrounding rotor 200 and the other structures.

In some embodiments, the coolant flows out of the hole structure 104, and due to the presence of the interlayer connection plate 301, the coolant continuously flows from the hole structure in one rotor unit 100 to the hole structure 104 in adjacent rotor unit 100, which allows the coolant to be transmitted within the rotor segments, thereby achieving cooling effect in the rotor.

In some embodiments, the interlayer connection plate 301 also includes a front interface 307 and a back interface 308 of the hole 109 at the flux barrier area. The front interface 307 and the back interface 308 of the hole at the flux barrier area correspond to the hole at the flux barrier area on the first flow guide plate 401, so that during the flowing process of the coolant, the coolant can flow from the front interface 307 and the back interface 308 of the hole at the flux barrier area to the surface of the rotor punching sheet 101, thereby achieving cooling effect on the rotor punching sheet 101.

In some embodiments, the axial channels of the interlayer connection plate 301 are designed in a continuous inclined manner, so that the coolant can flow between the two adjacent overlapping rotor units 100. At the same time, the interlayer connection plates on the left and right sides of the rotor unit 100 are mirrored symmetrically. This is because the rotor includes a step skewed pole, except that the physical position angles of the two middle rotor units are the same, the other adjacent rotor units will have a mechanical angle shift of 2.5 degrees in the circumferential direction, so a direct connected interlayer connection plate cannot be used for guiding the flowing of the coolant.

Figure 23:
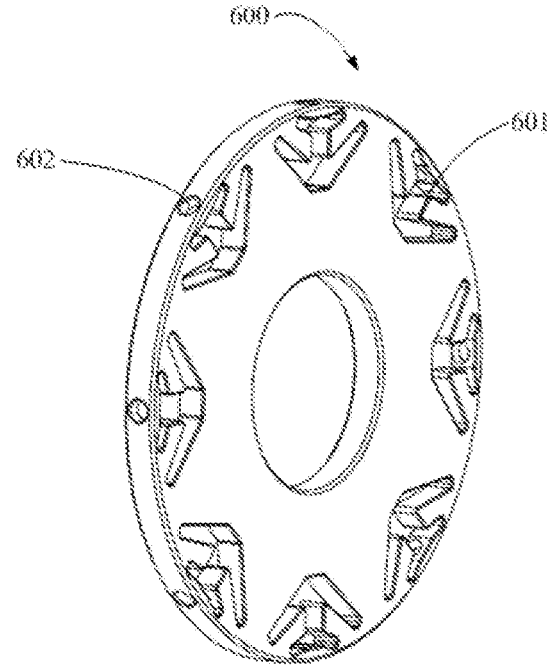
FIG. 23 illustrates a schematic structural view of a second flow guide plate according to an embodiment of the present disclosure.

Referring to FIG. 23, in some embodiments, a second flow guide plate 600 is arranged at each end of the rotor.

Figure 24:
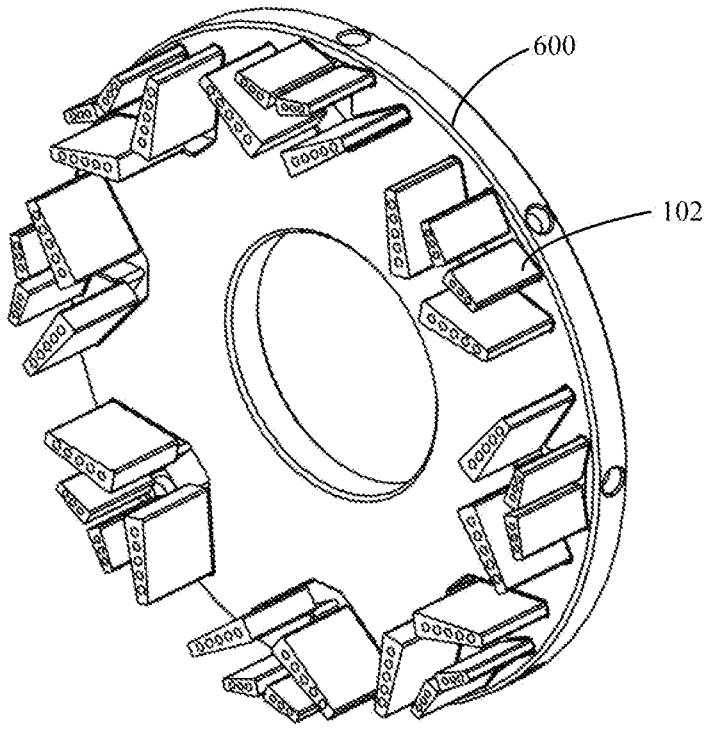
FIG. 24 illustrates a schematic structural view showing a relationship between a second flow guide plate and magnet units according to an embodiment of the present disclosure.

FIG. 24 shows a relationship between the second flow guide plate 600 and the magnet unit 102.

In some embodiments, due to the presence of the plurality of rotor units 100 in the first rotor group 403 and the second rotor group 404, the rotor units 100 are located between the second flow guide plate 600 and the adjacent interlayer connection plate 301.

In other embodiments, when the first rotor group 403 or the second rotor group 404 includes only one rotor unit 100, the rotor unit 100 is located between the second flow guide plate and the adjacent first flow guide plate 401.

In some embodiments, there are two second flow guide plate 600 located at both ends of the rotor.

In some embodiments, the second flow guide plate 600 includes a second flow guide path, and the second flow guide path includes a second flow guide path inlet 601 and a second flow guide path outlet 602 communicated with each other. The second flow guide path inlet 601 corresponds to the magnet unit 102, and the ends of the magnet unit 102 are located at the second flow guide path inlet 601.

In some embodiments, the size of the second flow guide path inlet 601 is smaller than the end size of the magnet unit 102, but the second flow guide path inlet 601 can cover all the hole structures on the magnets. The purpose of this arrangement is to ensure that the coolant can fully flow into the second flow guide plate and avoid axial movement of the magnets due to looseness after long-term use.

In other embodiments, the size of the second flow guide path inlet 601 may also be equal to the end size of the magnet unit 102.

In some embodiments, the second flow guide path inlet 601 provides an inlet for the inflow of the coolant, and the second guide flow path outlet 602 provides an outlet for the outflow of the coolant.

In some embodiments, the second flow guide path inlet 601 also serves as an inlet for coolant collection, and the coolant flowing out of the hole structure is collected in the second flow guide path inlet.

In some embodiments, the second flow guide path inlet 601 also serves as an access port at the end of the magnets, and the ends of the magnets at both ends of the rotor precisely fall into the second flow guide path inlet.

In some embodiments, the second flow guide path outlet 602 is located on the side wall of the second flow guide plate and uniformly distributed along the circumferential direction of the second flow guide plate 600.

In some embodiments, the number of the second flow guide path outlet 602 is a multiple of the number of poles of the rotor, which can be an integer multiple, such as 2 times, 3 times, etc., or a non-integer multiple, such as 2.5 times, 2.1 times, etc.

In some embodiments, a stator assembly is arranged on the outer side of the rotor. The stator assembly includes a stator core 700 and a plurality of windings 800 around the stator core.

In some embodiments, an oil supply pipe is arranged in the central shaft 402.

In some embodiments, the coolant enters the inner cavity of the central shaft 402 of the rotor through the oil supply pipe, and the flow guide hole 405 is arranged in the middle of the central shaft 402. The coolant enters the inner cavity of the first flow guide plate 401 through the flow guide hole 405, and enters the first rotor group 403 and the second rotor group 404 from left and right sides after direction adjustment of the first flow guide plate 401. Due to the presence of three types of cooling channels in the first flow guide plate 401, there are also three types of cooling channels on the first rotor group and the second rotor group, namely a first perforated channel, a second perforated channel, and a flux barrier intermediate channel. However, as the rotor usually adopts a step skewed pole to eliminate harmonics, the three types of cooling channels between each two adjacent rotors are not directly connected. In order to allow the coolant to flow smoothly from the first flow guide plate to the second flow guide plate, except for the two rotor units on two sides of the first flow guide plate, an interlayer connection plate is arranged between each two adjacent rotor units. The second magnet unit interface on the interlayer connection plate serves as a channel, which belongs to an inclined communication, that is, the shape of the right flow guide matches the shape of the right magnet unit, and the shape of the left flow guide matches the shape of the left magnet unit. In this way, the coolant will continue to pass through these three types of cooling channels and enter the second flow guide plate at both ends. The thickness surface of the second flow guide plate includes a uniform second flow guide path outlet along the circumferential direction. The coolant is sprayed to the ends of stator assembly of the motor through the second flow guide path outlet, and finally converges to the bottom of the housing, flowing out through an oil outlet. This process achieves cooling effect in the rotor, the magnets and the stator assembly, to avoid the risk of overheating or demagnetization of the magnets in the high-speed range.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A motor structure, comprising:

a rotor comprising a first rotor group and a second rotor group, and one rotor unit in the first rotor group and one rotor unit in the second rotor group are arranged adjacent to each other, wherein the rotor unit comprises a rotor punching sheet, a plurality of magnet units comprising a magnet and arranged on the rotor punching sheet, and a hole structure arranged in the magnet;

a first flow guide plate having a central hole and arranged between two adjacent rotor units, wherein the first flow guide plate comprises a first flow guide path therein; and a central shaft passing through a center of the rotor and the central hole, wherein the central shaft is provided with a flow guide hole, and the flow guide hole, the first flow guide path and the hole structure are communicated with each other;

wherein when the first rotor group comprises a plurality of rotor units and the second rotor group comprises a plurality of rotor units, the motor structure further comprises a plurality of interlayer connection plates arranged between adjacent rotor units in the first rotor group and between adjacent rotor units in the second rotor group;

wherein each interlayer connection plate comprises a second magnet unit interface extending through the interlayer connection plate.

2. The motor structure according to claim 1, wherein the rotor comprises a V-shaped skewed pole structure or a straight-line-shaped skewed pole structure.

3. The motor structure according to claim 2, wherein when the rotor comprises the straight-line-shaped skewed pole structure, and the sum of the number of the rotor units in the first rotor group and the number of the rotor units in the second rotor group is odd, the first flow guide plate is arranged in both halves of the rotor unit when any one of the rotor units is cut into two halves.

4. The motor structure according to claim 1, wherein the first flow guide path comprises a first flow guide path inlet and a first flow guide path outlet communicated with each other, and the first flow guide path inlet is arranged on a side wall of the center hole, wherein the flow guide hole is arranged corresponding to the first flow guide path inlet.

5. The motor structure according to claim 4, wherein the first flow guide plate further comprises a first magnet unit interface extending through the first flow guide plate, and the first flow guide path outlet is arranged corresponding to the first magnet unit interface, wherein a side wall of the first magnet unit interface exposes the first flow guide path outlet, and ends of the magnet units on two sides of the first flow guide plate are arranged at the first magnet unit interface.

6. The motor structure according to claim 1, wherein the second magnet unit interface is arranged corresponding to the magnet units, and ends of the magnet units on two sides of each interlayer connection plate are arranged at the second magnet unit interface.

7. The motor structure according to claim 1, further comprising a second flow guide plate arranged at each end of the rotor.

8. The motor structure according to claim 7, wherein the second flow guide plate comprises a second flow guide path, and the second flow guide path comprises a second flow guide path inlet and a second flow guide path outlet communicated with each other, wherein the second flow guide path inlet is arranged corresponding to the magnet units, and ends of the magnet units are arranged at the second flow guide path inlet.

9. The motor structure according to claim 8, wherein the second flow guide path outlet is arranged on a side wall of the second flow guide plate and uniformly distributed along a circumferential direction of the second flow guide plate.

10. The motor structure according to claim 9, wherein the number of the second flow guide path outlet is a multiple of the number of poles of the rotor.

11. The motor structure according to claim 1, wherein the hole structure extends through the magnet.

12. The motor structure according to claim 1, wherein each magnet unit comprises one or more magnets.

13. The motor structure according to claim 1, wherein the hole structure comprises one or more selected from a group consisting of a circular hole, a triangular hole and a rectangular hole.

* * * * *